US009900278B2

(12) United States Patent
Bank et al.

(10) Patent No.: US 9,900,278 B2
(45) Date of Patent: Feb. 20, 2018

(54) ELICITING POSITIVE RESPONSES TO A SOCIAL MEDIA POSTING

(71) Applicant: International Business Machines Corporation, Armonk, NY (US)

(72) Inventors: Judith H. Bank, Cary, NC (US); Lisa M. W. Bradley, Cary, NC (US); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/734,432

(22) Filed: Jun. 9, 2015

(65) Prior Publication Data

US 2016/0366089 A1  Dec. 15, 2016

(51) Int. Cl.
 H04L 12/58  (2006.01)
(52) U.S. Cl.
 CPC .............. *H04L 51/32* (2013.01); *H04L 51/26* (2013.01); *H04L 51/16* (2013.01)
(58) Field of Classification Search
 CPC .......... H04L 51/32; H04L 51/26; H04L 51/16
 USPC ........................................................ 709/206
 See application file for complete search history.

(56) References Cited

U.S. PATENT DOCUMENTS

| 2006/0242554 | A1* | 10/2006 | Gerace .............. G06F 17/30867 715/209 |
| 2010/0257023 | A1 | 10/2010 | Kendall et al. |
| 2011/0041082 | A1 | 2/2011 | Nguyen |
| 2012/0272160 | A1* | 10/2012 | Spivack ................. G06Q 10/10 715/752 |
| 2013/0275348 | A1 | 10/2013 | Booth et al. |
| 2014/0280637 | A1 | 9/2014 | Hamilton, II et al. |
| 2015/0025977 | A1* | 1/2015 | Doyle .................... G06Q 50/01 705/14.66 |

FOREIGN PATENT DOCUMENTS

| WO | 2007120686 A2 | 10/2007 |
| WO | 2013116825 A1 | 8/2013 |
| WO | 2013150479 A2 | 10/2013 |

OTHER PUBLICATIONS

"System and Method to Automatically Identify Appropriate Social Network Recipients for a Post Based on Content and Prior User Behavior" IP.Com; IPCOM000229415D; (Jul. 28, 2013), 3 pages.
http://www.bufferapp.com, accessed on Jun. 5, 2015, 2 pages.

* cited by examiner

*Primary Examiner* — Tu Nguyen
(74) *Attorney, Agent, or Firm* — Scully, Scott, Murphy & Presser, P.C.; Daniel Simek

(57) ABSTRACT

Communicating social media content over a computer network via one or more social media services, in one aspect, may include receiving content from a first node of an online social network. A set of topics in the content is generated. Based on monitoring of online activities of target audience, topic popularity corresponding to a topic in the set of topics over a plurality of time ranges is determined. A trending metric associated with the topic is generated. Weighted topic popularity for a respective one of the plurality of time ranges is generated, as a function of the topic popularity, the trending metric, and an elapsed time between time associated with the respective time range and a preferred time for posting the content. A time range from the plurality of time ranges are selected based on the weighted topic popularity for posting the content.

20 Claims, 4 Drawing Sheets

ELICITING POSITIVE RESPONSES TO A SOCIAL MEDIA POSTING

FIELD

The present application relates generally to computers and computer applications, and more particularly to social computing, collaboration and communications.

BACKGROUND

There are services that assist a user in publishing social media posts at desired times. For example, a known service allows the user to queue up posts in advance and release the posts at times known to be most popular amongst target audience. Other similar services exist that aims to find the ideal time or schedule to publish social media posts. The existing services and products are purely time based to create time windows that are most ideal based on available audience. Such a generic solution is not always enough to create a high impact.

BRIEF SUMMARY

A method and system of communicating social media content over a computer network via one or more social media services may be provided. The method may be performed by one or more processors, for example, coupled with one or more memory devices. The method, in one aspect, may include receiving content from a first node of an online social network. The method may also include generating automatically a set of topics in the content. The method may further include inspecting a target audience of the content by monitoring online activities of the target audience. The monitoring online activities may comprise monitoring processor threads running on the one or more processors. The method may also include determining, based on the monitoring of the online activities, topic popularity corresponding to a topic in the set of topics over a plurality of time ranges, the topic popularity indicating a degree to which the topic is popular with the target audience at a given time range. The method may further include generating a trending metric associated with the topic, the trending metric indicating a degree to which the topic is currently popular among all users of the online social network. The method may also include generating a weighted topic popularity for a respective one of the plurality of time ranges, as a function of the topic popularity, the trending metric, and an elapsed time between time associated with the respective time range and a preferred time for posting the content. The method may also include selecting a time range from the plurality of time ranges based on the weighted topic popularity. The method may further include posting the content at the selected time range on the online social network on a display device.

A system for communicating social media content over a computer network via one or more social media services, in one aspect, may include one or more hardware processors. A user interface may be operable to execute on the one or more hardware processors and further operable to receive content from a first node of an online social network. One or more of the hardware processors may be operable to generate automatically a set of topics in the content. The one or more of the hardware processors may be further operable to inspect a target audience of the content by monitoring online activities of the target audience, the monitoring online activities comprising monitoring processor threads running on the one or more of the hardware processors. The one or more of the hardware processors may be further operable to determine based on the monitoring of the online activities, topic popularity corresponding to a topic in the set of topics over a plurality of time ranges, the topic popularity indicating a degree to which the topic is popular with the target audience at a given time range. The one or more of the hardware processors may be further operable to generate a trending metric associated with the topic, the trending metric indicating a degree to which the topic is currently popular among all users of the online social network. The one or more of the hardware processors may be further operable to generate a weighted topic popularity for a respective one of the plurality of time ranges, as a function of the topic popularity, the trending metric, and an elapsed time between time associated with the respective time range and a preferred time for posting the content. The one or more of the hardware processors may be further operable to select a time range from the plurality of time ranges based on the weighted topic popularity. The one or more of the hardware processors may be further operable to post the content at the selected time range on the online social network via the user interface. The system may further include a display device, on which the content is posted.

A computer readable storage medium or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
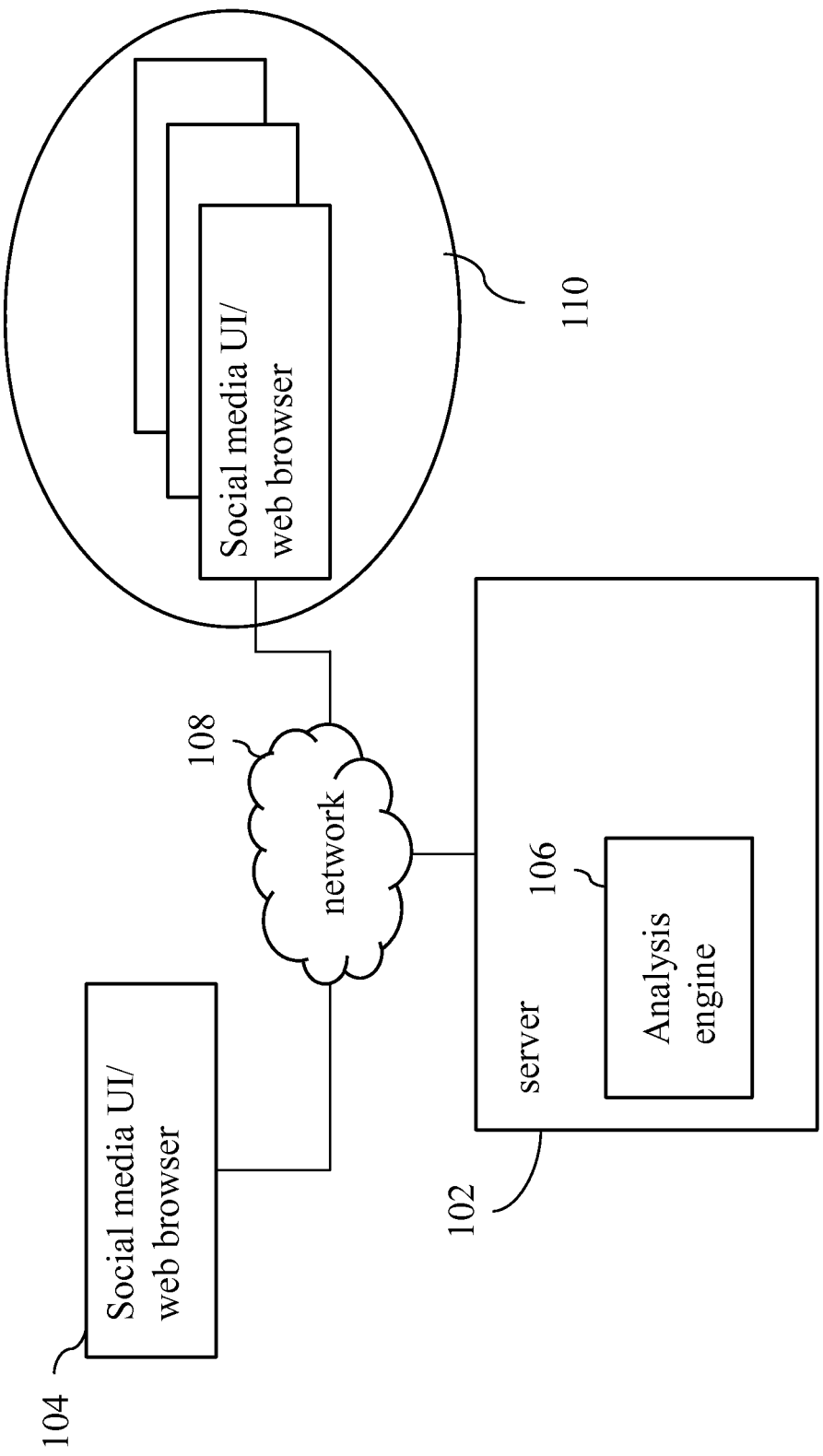
FIG. 1 is a diagram illustrating system components of a system that elicits positive response in social media in one embodiment of the present disclosure.

A method and system may be provided that elicit positive response to social media content. In one embodiment of the present disclosure, the method and system may perform analysis of specific content of a desired posting and cross reference with attributes of target audience or current trends on social channel. For example, given the same set of followers in social media, there may be content that are better posted earlier in the day and other content that are better posted later in the day for eliciting more or positive responses. Further, content may be better posted to a subset of target users known to have positive sentiment or agreement with a known type of content. In addition, a non-standard time window may see a certain topic unexpectedly trending, in which it would be ideal to insert a posting on the topic. Existing services do not perform such analysis of social media post content to optimize consumption to target optimal time or user groups.

The timing of a social media post helps in allowing largest potential reach and highest impact. For example, if a poster creates a posting when relatively few people are online at 3 a.m., there is not likely going to be much consumption of the content. This light consumption may not be ideal under circumstance, e.g., if the poster is a digital marketing professional, an enterprise social media manager, or another whose job it is to ensure that content has high reach. Hence, controlling the timing of the posting may provide for higher reachability to target audience and the message may have a higher impact on the target audience.

A system and method are disclosed that in one embodiment analyze the content of a social media posting at composition (or queuing) time and determine the publication time and/or target subset of users depending on the message content. The system and method allow for publishing posts with higher impact, larger reach, and better sentiment. The approach of the present disclosure may be useful to social media managers because it allows them to be more efficient and successful.

In one embodiment, the system and method may vary social media posting time based on content of the message, vary the subset of target users based on content analysis, vary the content based on whether it represents an addition to the current body of information expressed on this topic or it is a duplication of current existing content and should be suppressed, vary social media posting time based on selected personalization factors specified by a user posting the message (e.g., trending sentiment expressed by others relative to the sentiment expressed in the user's message). The system and method of the present disclosure in one embodiment may provide for efficient usage of social media for an enterprise or an organization.

A system and method in one embodiment combine the analysis of the topical content of a message and matches to users who are interested in such a topic at a given time, for example, in order to maximize the effective consumption rate of a message. For instance, a given individual may be interested in different content at different times. Not all online users on a social network may be interested in a posting. The system and method may determine the time and/or target audience of a posting. An embodiment of the system and method of the present disclosure may seek to match the body of content in the message with the highest impact time when contacts, followers, and/or friends related to the topic will consume the message. These followers may be the same individuals during different times, but their interests change over time. For example, the system may post pictures of a poster's family during off-business hours when the poster's friends, contacts, and/or followers are not busy working. The system may post technical articles about software development during the business week. In one aspect, the poster's group of followers does not change, but their interests do change over time or based on the time, and the system allows the postings the poster makes to cater to their interests at the right time. In one embodiment, the system and method of the present disclosure may uniquely time the posting of a message based on the topic of the message and the current interests of the user's target audience at a given time. The system and method of the present disclosure in one embodiment determines when to post a message, for example, in a public forum, or a social network, such that the users on such network would consume the message, for example, when to send a message based on the changing interest and focus of a fixed set users at a given time.

FIG. 1 is a diagram illustrating system components of a system that elicits positive response in social media in one embodiment of the present disclosure. In one embodiment, responsive to a social media user submitting a posting to a server 102 that for example provides a social media service, e.g., via a user interface such as a browser 104 and computer network 108, the content data is routed through an analysis engine 106 on a server 102. The analysis engine 106 determines the posting's topic(s) and target audience 110 and determines a time (e.g., the time that is determined to be ideal for a purpose or an optimal time) to publish the content. The calculated time may also be influenced by current trending topics among the general population (e.g., more than just the target audience) of the social media service. Trend or trending refers to a topic that is popular on social media at a given time. If the current time is determined to be not the ideal time, the user is prompted via a user interface (UI) 104 whether the user wishes to schedule this message for a suggested time. The reasons for new suggested time are displayed.

The server 102 may be a computer server, for example, a web server, that provides a social network or networking service or site, allowing users to create profiles within the site and form relationships with other users of the same site who access their profile, create online communities to share information, ideas, messages, and other content via electronic communications. Data associated with the plurality of nodes, e.g., user profiles and relationships in one embodiment are written in a memory device, e.g., in a memory partition or sector, the memory device coupled to the server 102. A social network service may include online community sites, online discussions forums, chat rooms and other social spaces online. A social network for example includes a plurality of nodes, a node representing a user with a profile, and enable users to connect to other users by forming relationships, e.g., friends. A social network structure thus may include a plurality of nodes representing users and connections among the nodes based on user relationships. The user interface (UI) may be a browser that presents a web page of the web server providing the social networking service.

For example, at 10 AM User A composes a social media post about dinner recipes. At submission time, the server observes this is a post about dinner recipes, and finds or determines that the best time to post dinner recipes is 3 PM to his particular target audience. The social media UI prompts User A that 3 PM would likely be a better time to send this message based on the findings. User A may select the system to schedule the posting for 3 PM or may override the suggestion and post the message at the time of the submission.

Figure 2:
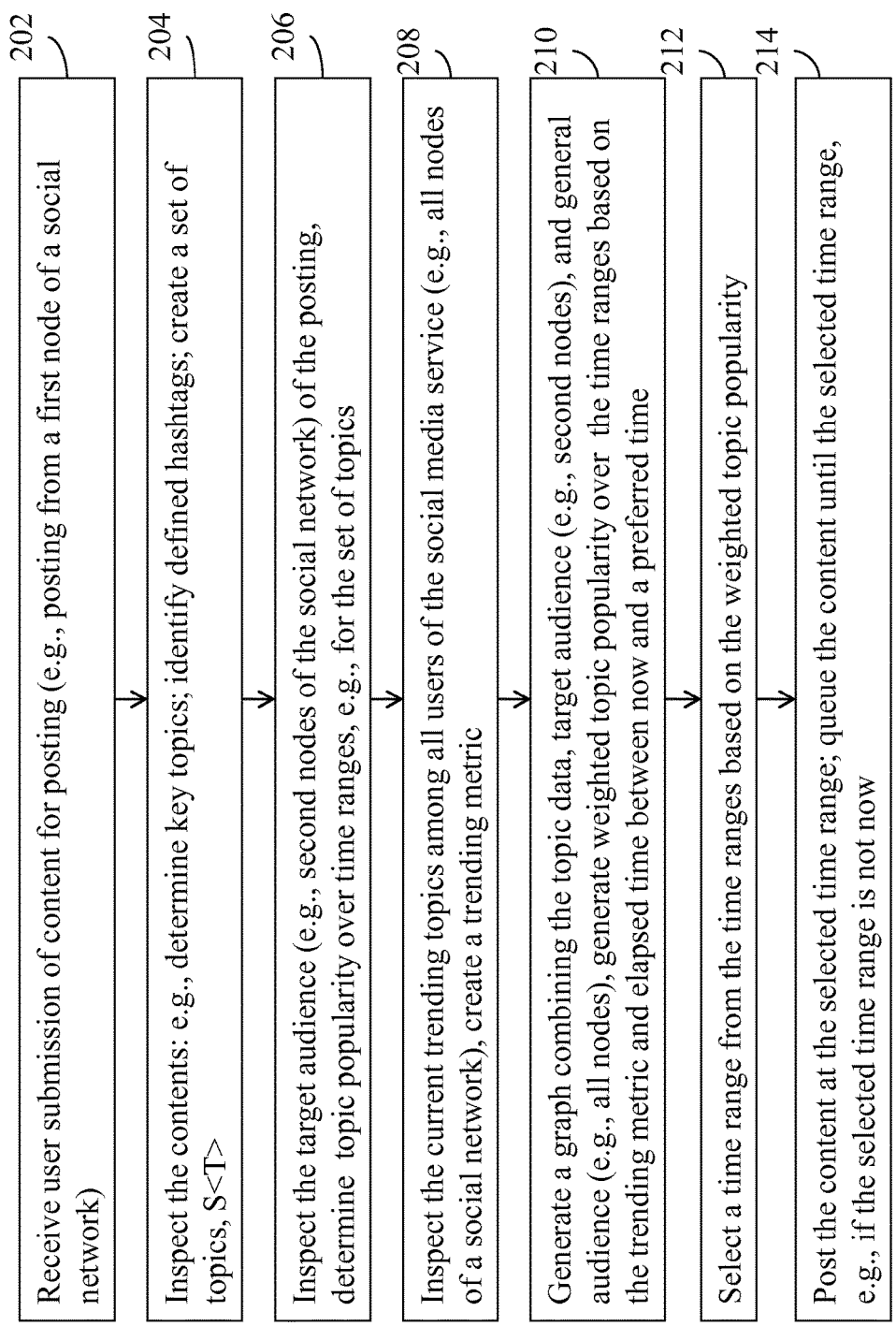
FIG. 2 is a flow diagram illustrating a method of discovering a posting time for a user submission in one embodiment of the present disclosure.

In one embodiment of the present disclosure, the analysis engine 106 discovers a preferred posting time, for example, as illustrated in FIG. 2. FIG. 2 is a flow diagram illustrating a method of discovering a posting time for a user submission in one embodiment of the present disclosure. A user submits posting content to social media service, e.g., a user (FIG. 1, 102). A node of a social network (e.g., a first node) represents a user. Other nodes of the social network (e.g., second nodes) that are connected to the first node (user) are considered to be in the social network of the user (first node). A node (user) may be connected as a friend directly or indirectly, by likes/dislikes, or other relationships in a social network. At 202, a user submission is received by a server.

At 204, the server (e.g., an analytics engine of the server) inspects the contents of the electronic posting, for example, by reading a memory that stores the content. For example, the server may determine key topics discussed in the posting using a natural language processing (NLP) technique. In addition, one or more hashtags that are defined in the content are identified or observed. Hashtag is a word or phrase preceded by a symbol, e.g., the "#" sign. Hashtag is a way of marking a topic (or topics) of social media messages, for example, so that others can discover and share them. A set of topics (S<T>) may be generated based on the key topics in the content and the hashtags.

At 206, the server in one embodiment inspects the target audience of the posting, e.g., the user's specific "social network". Inspecting the target audience (other or second nodes of the social network) may include determining the most active time windows for members of the user's social network as related to the topics identified at 204. Determining the active time windows may include taking into account the different time zones where the poster and target audience are located. For instance, User A may live in one time zone location while most of the user A's social network base is located another time zone location. For instance, a time zone analysis for determining the most active time windows may include observing or identifying posting patterns of social network members; observing or identifying re-posting patterns of social network members; observe or identifying click-through patterns of social network members; and/or observe or identifying browsing patterns of social network members.

Inspecting the target audience may include monitoring online activities of the target audience, e.g., monitoring processor threads running on the one or more processors. Based on the monitoring of the online activities, topic popularity may be determined corresponding to a topic in the set of topics over a plurality of time ranges, the topic popularity indicating a degree to which the topic is popular with the target audience at a given time range. For instance, inspecting the target audience at 206 also may include generating a set of points to construct histograms correlating popularity of a topic over time. For example, for each topic, T, in a set of topics, S<T> generated at 204, a set of points is generated to construct the topic popularity histogram for time ranges such as: Time of day, or Day of week, or another time range. For instance, the set of points may be generated around social trends of the target audience, e.g., using an existing technique that show topics currently trending in social networks. This trending data may be correlated into the histogram using time correlation. The present disclosure does not limit the time ranges for histograms to those examples only. The histogram data for each topic may be stored in new collection, H<T>.

At 208, the server inspects current trending topics amongst all users of the social media service (e.g., the "general audience"). A trending metric associated with the topic may be generated, the trending metric indicating a degree to which the topic is currently popular among all users of the online social network. For example, the server may identify the current re-posting rate for postings related to this topic the user posted, for example, to determine the popularity of the topic among a targeted group of users (e.g., the user's followers) and a general group of users (e.g., all users of the social network). The server may also identify the current click-through rate for postings related to this topic. The server may also identify the current number of posts related to topics or hashtags determined at 204. Based on the identifying, the server in one embodiment creates a trending metric to indicate the degree to which the topics are currently popular. A trending metric may be generated as follows: Let the metric P, be a value between 0 and 1. 1 indicates no trending activity at this time on the social media service. 0 indicates strong trending activity on the social media service. In one embodiment, P is determined per bucket. In another aspect, the topic may be transformed into a related topic, for example, a generalized form of the topic, for example, for computing the trending metric on the generalized form of the topic.

At 210, the server generates a graph combining the topic data, target audience, general audience. The graph, for example, is a numerical graph generated for machine (e.g., computer processor or the server) consumption, and ranks topics by time. Based on the graph, the server may decide when and where to post the user's data to be read or seen by most number of people. For example, histogram data points H<T> stored at 206 are combined to determine the preferred days and hours to publish the topic in question. For example, histogram points from each topic in H<T> are overlayed, and an aggregate histogram is created based on all included topics. For example, a table may be created that includes results from each of the generated histograms. From the aggregate histogram set, the most popular topic publication window may be calculated or determined.

To calculate or determine the most popular topic publication window from aggregated histogram set, the following procedure may be performed. The value, N, may be normalized in each histogram bucket, e.g., with value of 1 being most popular and value of 0 being least popular. Other normalization values may be used. For example, each histogram represents a topic's popularity over time. Overlaying the histograms to aggregate the histograms aligns the buckets by time. The N value is set based on the popularity of a given topic at a given time, providing a comparative metric over other histogram buckets. For example, taking the set of all topics and the current populations, it is a way to rank the popularity.

The generation of a graph at 210 further includes cross referencing a preferred day with the trending metric determined at 208. In one embodiment, the preferred day may have been provided by a user, for example, when the user posted the data to the service. In another aspect, the preferred day may have a default value of today. The cross referencing may include calculating the elapsed time, E, from "now" until each histogram bucket.

A weighted topic popularity may be generated for each of the histogram buckets representing time ranges. A trend weight metric W is expressed as a function of current trend popularity (P) and elapsed time (E) to each histogram bucket. P as described above was determined per bucket. For instance, for a given P value associated with a histogram given, a weight (W) is assigned, for example, by multiplying the P value of a given histogram bucket by the amount of time from "now" until the time represented by the given histogram bucket. Buckets in distant future transform P closer to value of 1, diminishing importance of P. Buckets in near future transform P closer to value of 0, increasing importance of P. This implies a preference to post to the closest time slot to the preferred day (or time), e.g., specified by the user. For instance, even if a given day is determined to be most popular day to post about the topic, if it is far away, its popularity may be reduced after the W value is applied, and another more practical day becomes mathematically more significant. The cross referencing may also include, for each histogram bucket, dividing the normalized value N by W. Popular trending topics will increase the normalized weight of close buckets (closer to the preferred day or time), for instance, relative to other buckets. Popular trending topics will have little impact on distant buckets.

The generation of graph at 210 also includes reducing the graph to determine a suggested window (time window of a histogram bucket). For example, across the weighted histogram, the bucket with highest value N/W is selected. Weighted histogram refers to the histogram with values of W applied on the buckets. For instance, each bucket has W transformation applied on it, changing the skew of the histogram to prefer buckets closer to "now". At 212, a time range from the plurality of time ranges may be selected based on the weighted topic popularity. At 214, the content may be posted at the selected time range on the online social network, for example, displayed on a display device via a graphical user interface associated with the online social network. In one aspect, the content may be queued, for example, stored in a memory device, for example, if the selected time range is later than the current time.

Referring back to FIG. 1, in another embodiment, the analysis engine 106 may calculate an optimal set of target audience at the given time based on the content of the user's social media posting. For example, consider that User A is about to publish a post related to technology. Also consider that it is the evening, and User A does not want to queue the message for later but post it to the social media service right now. However, only some of the users in User A's social network really care about technology postings in the evenings and other users dislike the technology postings. In fact, the second group of users may be likely to leave User A's social network if they see too many postings about technology. The analysis engine 106 determines that the post should ideally be delivered to a subset of User A's social network at the given time. The server 102 in one embodiment prompts User A with this suggestion via the social media UI 104, similar to the time embodiment above.

Figure 3:
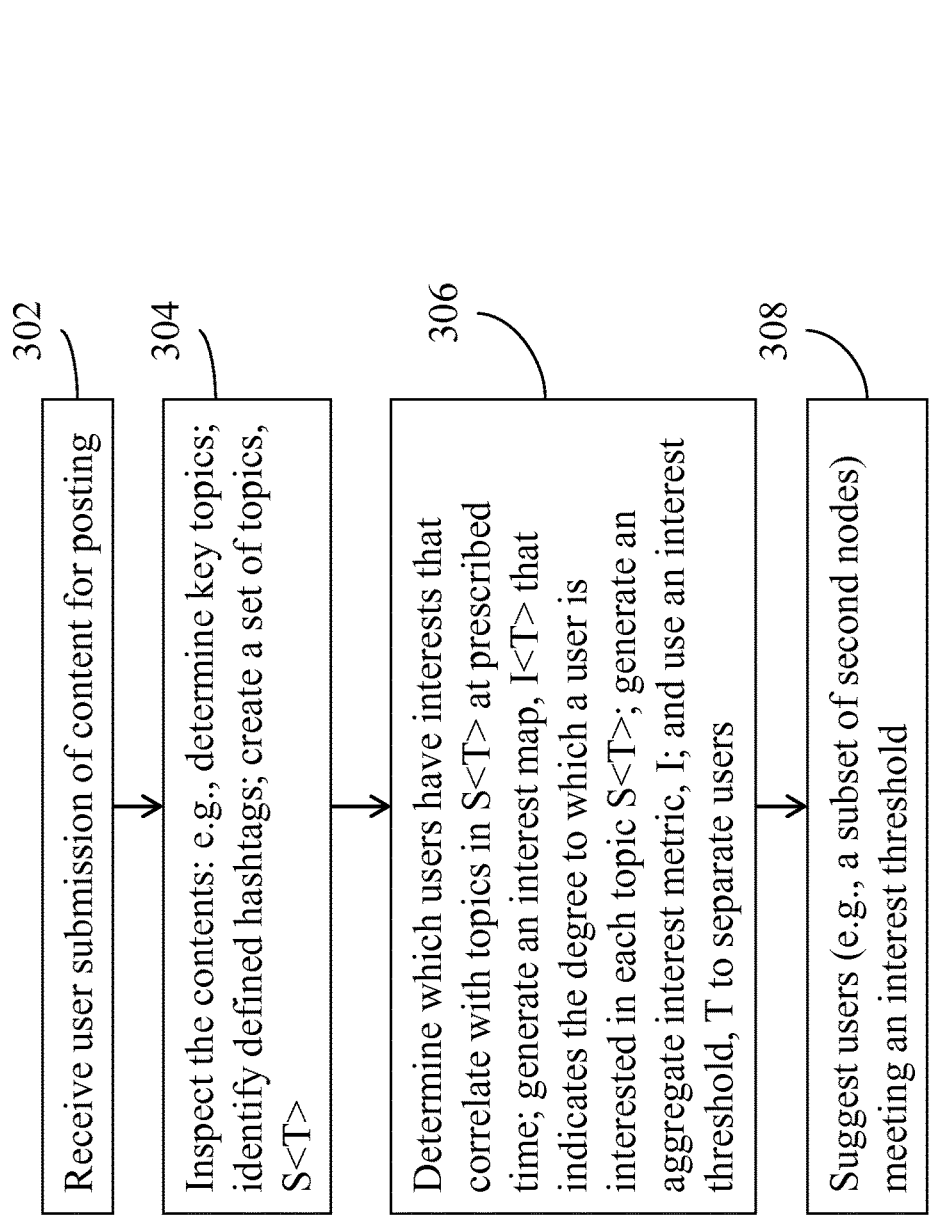
FIG. 3 is a flow diagram illustrating a method flow for discovering a preferred target audience, for example, by the analysis engine in one embodiment of the present disclosure.

FIG. 3 is a flow diagram illustrating a method flow for discovering a preferred target audience, for example, by the analysis engine in one embodiment of the present disclosure. User submits posting content to social media service (e.g., a server). At 302, the server receives the posting content. At 304, the server inspects the contents of the posting. Inspecting the content may include determining key topics discussed in the posting using, e.g., a natural language processing (NLP) technique or another technique; Observing or identifying defined hashtags; and creating a set of topics, $S<T>$.

At 306, the server inspects the target audience of the posting (e.g., the user's specific "social network"). For example, the server may determine which users have interests that correlate with topics in $S<T>$ at prescribed time; generate an interest map, $I<T>$ that indicates the degree to which a user is interested in each topic $S<T>$; generate an aggregate interest metric, I; and use an interest threshold, T to separate users.

In one aspect, the interest map, $I<T>$ may be generated as follows. Interest map is a metric that indicates a user's interest in a given set of provided topics. For example, given an $S<T>$ that may include [topic 1, topic 2, topic 3, topic 4], a user's $I<T>$ may include [0.7, 0.3, 0.2, 0.9]. An interest value may be set between a lower bound (e.g., 0) and upper bound (e.g., 1). For example, based on the frequency a topic appears in a user's social media, an interest value between 0 and 1 may be set for the user on that topic. For example, an interest value of 0 indicates no interest and an interest value of 1 indicates a high degree of interest on a topic. An aggregate interest metric I may be generated. An aggregate interest map in one embodiment is a mashing of all of the individual user maps together, generating a single value for each of one or more topics in $I<T>$. An interest threshold T may be defined and users may be separated into two groups based on the threshold T: e.g., those users who have interest level below the threshold ($B<U>$) and those users having interest level above the threshold ($A<U>$) for the topic that is to be posted.

At 308, it is suggested to the user that the post be published specifically to users above the interest threshold, members of $A<U>$. The suggestion, e.g., is presented via a user interface (e.g., FIG. 1, 104).

In yet another embodiment, the social media service may dynamically change the scheduled posting time of a user's queued postings based on the changing environment of current trending topics. For example, an analysis engine (e.g., FIG. 1, 106) monitors the user's queue and recalculates the optimal posting time, e.g., based on the method flow shown in FIG. 2. If the calculated time or target audience has changed, the server may dynamically make changes. In one embodiment, whether to dynamically make changes may be based on pre-authorization parameters configured by a user.

The method in one embodiment of the present disclosure allows for posting media content via a social media service and maximizing positive responses from the posted media content. The media content may include but are not limited to text, pictures, photographs, video and other content. For example, responsive to receiving a text by a server from a user using a user interface via a computer network, the text to be distributed to others, the server may analyze the text to determine a first content and a segment of recipients predicted to have a positive sentiment based on the first content. The segment of recipients may be analyzed for a history of interactions to predict a date/time to optimize or reduce response time from the segment of recipients. The first content may be sent to the segment of recipients at the predicted date/time. The first content may be the entire content, e.g., text. In another aspect, the first content may include a subset of the content, e.g., text, and the remainder of the content, e.g., text may be saved in a memory partition or sector of a memory device and sent at a different time. The server, for example, may be a computer system or server that may provide one or more of the following services: instant messaging (IM), short message services (SMS), blog, web site, online networking community (e.g., social network community), electronic news feed, electronic mail, and/or others.

Figure 4:
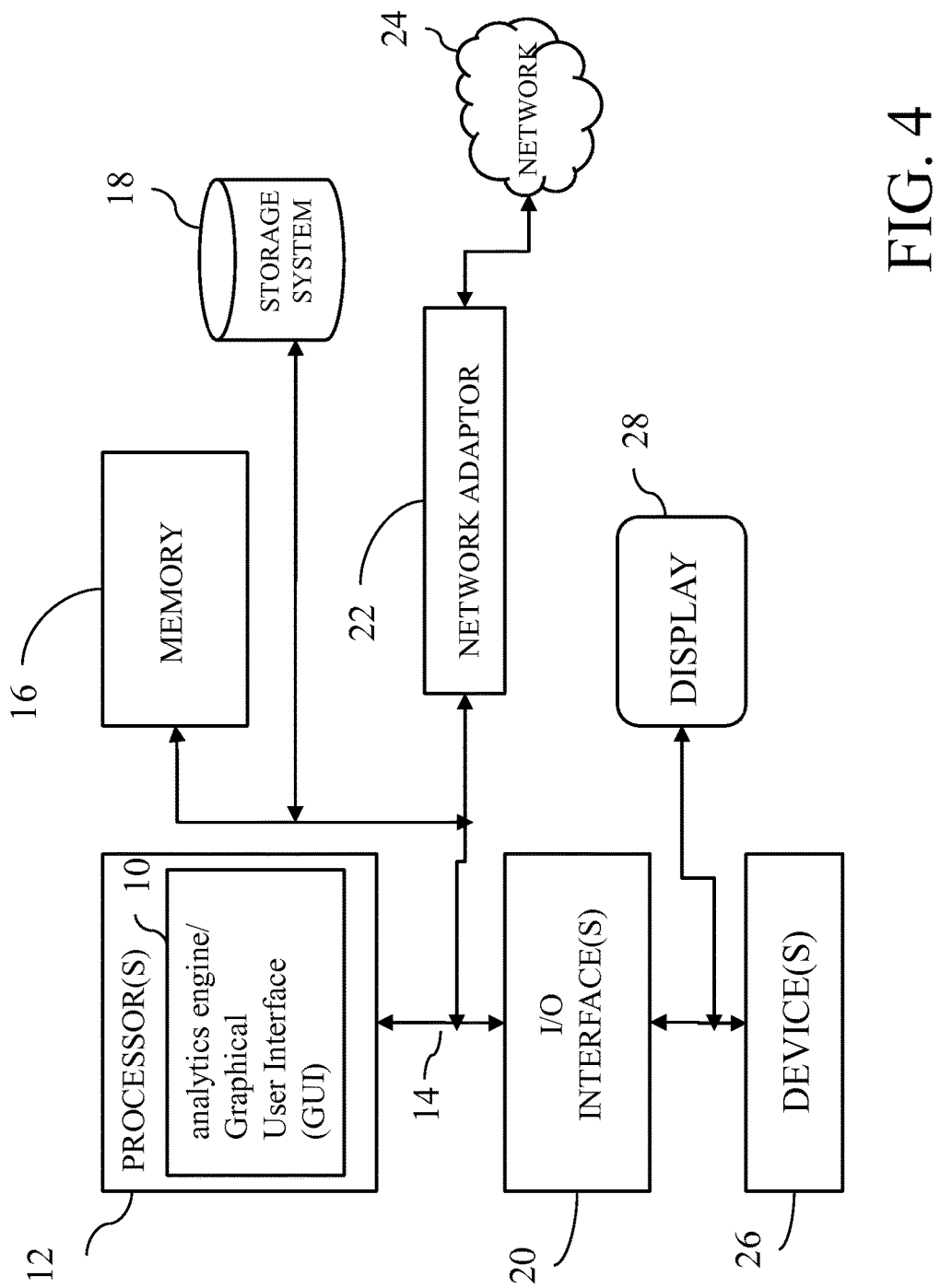
FIG. 4 illustrates a schematic of an example computer or processing system that may implement a social media posting system in one embodiment of the present disclosure.

FIG. 4 illustrates a schematic of an example computer or processing system that may implement a social media posting system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of communicating social media content over a computer network via one or more social media services, the method performed by one or more processors, the method comprising:
   receiving content from a first node of an online social network;
   generating automatically a set of topics in the content;
   inspecting a target audience of the content by monitoring online activities of the target audience, the monitoring online activities comprising monitoring processor threads running on the one or more processors;
   determining, based on the monitoring of the online activities, topic popularity corresponding to a topic in the set of topics over a plurality of time ranges, the topic popularity indicating a degree to which the topic is popular with the target audience at a given time range;
   generating a trending metric associated with the topic, the trending metric indicating a degree to which the topic is currently popular among all users of the online social network;
   generating a weighted topic popularity for a respective one of the plurality of time ranges, as a function of the topic popularity, the trending metric, and an elapsed time between time associated with the respective time range and a preferred time for posting the content;
   selecting a time range from the plurality of time ranges based on the weighted topic popularity; and
   posting the content at the selected time range on the online social network via a display device.

2. The method of claim 1, wherein the determining topic popularity is performed for each topic in the set of topics, wherein all of the topic popularity for the given time range are aggregated and the weighted topic popularity is generated based on the aggregated topic popularity.

3. The method of claim 1, further comprising queuing the content in a memory sector associated with one or more of the processors.

4. The method of claim 1, wherein the preferred time for posting the content is received from the first node.

5. The method of claim 1, further comprising:
   determining the subset of the second nodes to direct the content based on an interest metric respectively associated with one or more of the second nodes.

6. The method of claim 1, further comprising:
changing the time based on changing environment of current trending of the set of topics.

7. The method of claim 1, wherein the plurality of time ranges are implemented and stored in memory as histogram buckets.

8. A non-transitory computer readable storage medium storing a program of instructions executable by a machine to perform a method of communicating social media content over a computer network via one or more social media services, the method comprising:
receiving content from a first node of an online social network;
generating automatically a set of topics in the content;
inspecting a target audience of the content by monitoring online activities of the target audience, the monitoring online activities comprising monitoring processor threads running on the one or more processors;
determining, based on the monitoring of the online activities, topic popularity corresponding to a topic in the set of topics over a plurality of time ranges, the topic popularity indicating a degree to which the topic is popular with the target audience at a given time range;
generating a trending metric associated with the topic, the trending metric indicating a degree to which the topic is currently popular among all users of the online social network;
generating a weighted topic popularity for a respective one of the plurality of time ranges, as a function of the topic popularity, the trending metric, and an elapsed time between time associated with the respective time range and a preferred time for posting the content;
selecting a time range from the plurality of time ranges based on the weighted topic popularity; and
posting the content at the selected time range on the online social network.

9. The non-transitory computer readable storage medium of claim 8, wherein the determining topic popularity is performed for each topic in the set of topics, wherein all of the topic popularity for the given time range are aggregated and the weighted topic popularity is generated based on the aggregated topic popularity.

10. The non-transitory computer readable storage medium of claim 8, further comprising queuing the content in a memory sector associated with one or more of the processors.

11. The non-transitory computer readable storage medium of claim 8, wherein the preferred time for posting the content is received from the first node.

12. The non-transitory computer readable storage medium of claim 8, further comprising:
determining the subset of the second nodes to direct the content based on an interest metric respectively associated with one or more of the second nodes.

13. The non-transitory computer readable storage medium of claim 8, further comprising:
changing the time based on changing environment of current trending of the set of topics.

14. The non-transitory computer readable storage medium of claim 8, wherein the plurality of time ranges are implemented and stored in memory as histogram buckets.

15. A system for communicating social media content over a computer network via one or more social media services, comprising:
one or more hardware processors;
a user interface operable to execute on the one or more hardware processors and further operable to receive content from a first node of an online social network;
one or more of the hardware processors operable to generate automatically a set of topics in the content,
the one or more of the hardware processors further operable to inspect a target audience of the content by monitoring online activities of the target audience, the monitoring online activities comprising monitoring processor threads running on the one or more of the hardware processors,
the one or more of the hardware processors further operable to determine based on the monitoring of the online activities, topic popularity corresponding to a topic in the set of topics over a plurality of time ranges, the topic popularity indicating a degree to which the topic is popular with the target audience at a given time range,
the one or more of the hardware processors further operable to generate a trending metric associated with the topic, the trending metric indicating a degree to which the topic is currently popular among all users of the online social network,
the one or more of the hardware processors further operable to generate a weighted topic popularity for a respective one of the plurality of time ranges, as a function of the topic popularity, the trending metric, and an elapsed time between time associated with the respective time range and a preferred time for posting the content,
the one or more of the hardware processors further operable to select a time range from the plurality of time ranges based on the weighted topic popularity,
the one or more of the hardware processors further operable to post the content at the selected time range on the online social network via the user interface.

16. The system of claim 15, wherein the one or more hardware processors determines the topic popularity for each topic in the set of topics, wherein all of the topic popularity for the given time range are aggregated and the weighted topic popularity is generated based on the aggregated topic popularity.

17. The system of claim 15, further comprising a memory coupled to the one or more of the hardware processors for queuing the content in a memory sector of the memory.

18. The system of claim 15, wherein the preferred time for posting the content is received from the first node.

19. The system of claim 15, wherein the one or more of the hardware processors is further operable to determine the subset of the second nodes to direct the content based on an interest metric respectively associated with one or more of the second nodes.

20. The system of claim 15, wherein the one or more of the hardware processors is further operable to change the time based on changing environment of current trending of the set of topics.

* * * * *